(12) United States Patent
Hutchison et al.

(10) Patent No.: US 8,301,852 B2
(45) Date of Patent: Oct. 30, 2012

(54) VIRTUAL STORAGE MIGRATION TECHNIQUE TO MINIMIZE SPINNING DISKS

(75) Inventors: Gordon Douglas Hutchison, Hampshire (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 12/269,973

(22) Filed: Nov. 13, 2008

(65) Prior Publication Data
US 2010/0122050 A1    May 13, 2010

(51) Int. Cl.
*G06F 12/00*    (2006.01)
(52) U.S. Cl. .................................................. 711/161
(58) Field of Classification Search .................. None
See application file for complete search history.

(56) References Cited

U.S. PATENT DOCUMENTS

| | | | |
|---|---|---|---|
| 6,961,815 B2 | 11/2005 | Kistler et al. | |
| 7,007,141 B2 * | 2/2006 | Li et al. | 711/162 |
| 7,035,972 B2 | 4/2006 | Guha et al. | |
| 7,117,294 B1 * | 10/2006 | Mi et al. | 711/101 |
| 7,117,322 B2 * | 10/2006 | Hochberg et al. | 711/160 |
| 7,200,546 B1 * | 4/2007 | Nourmohamadian et al. | 703/24 |
| 7,234,074 B2 | 6/2007 | Cohn et al. | |
| 7,904,689 B1 * | 3/2011 | Carothers | 711/170 |
| 2002/0144057 A1 | 10/2002 | Li et al. | |
| 2004/0054939 A1 | 3/2004 | Guha et al. | |
| 2007/0067559 A1 | 3/2007 | Fujibayashi et al. | |
| 2007/0079086 A1 | 4/2007 | Wang et al. | |

OTHER PUBLICATIONS

Colarelli, Dennis, et al., "The Case for Massive Arrays of Idle Disks (MAID)", Dept. of Computer Science, University of Colorado, Boulder (Jan. 7, 2002); pp. 1-6.

* cited by examiner

*Primary Examiner* — Brian Peugh
(74) *Attorney, Agent, or Firm* — Scully, Scott, Murphy & Presser, P.C.

(57) ABSTRACT

A method, and system for employing the method, for virtual data storage migration providing a plurality of data storage devices communicating with at least one computer system. A plurality of data being managed by the computer system and an archive data storage device is selected from the plurality of data storage devices. Specified data is selected for archiving in the archive data storage device when the archive data meets a specified archive criteria. After the archived specified data is accessed in the archive data storage device at a predetermined frequency, the archive data is migrated to an active data storage device in a powered up state. The archive data storage device is then powering down.

10 Claims, 2 Drawing Sheets

VIRTUAL STORAGE MIGRATION TECHNIQUE TO MINIMIZE SPINNING DISKS

FIELD OF THE INVENTION

The present invention relates to a method, and system employing the method, for virtual data storage migration, and more specifically, relates to a method and system for virtual data storage migration including designated active storage devices and archive storage devices.

BACKGROUND OF THE INVENTION

Currently, cost efficient disk drives allow for deploying large amounts of accessible storage, for example, on line storage. Conventional mass storage systems may use, for example, a redundant array of independent disks (RAID) clusters as a disk cache, often with a file system interface. The disk cache may be backed up by tape libraries which serve as the final repository for data. In mass storage systems where performance is an issue, tape back up may serve only as a deep archive for disaster recovery purposes. Tape back up requires considerable time to retrieve and access if required by loss of primary data storage. If a high availability system is required, the data is often duplicated on a separate system, with a fail-over mechanism controlling access to the additional system.

Data storage devices, for example, computer hard drives, have a motor driven (spinning) hard disk drive connected to a disk spindle. Currently, disk drive spindles consume energy to enable them to spin continually so data access latency is minimized. If a disk drive is powered down or spun down, it takes a period of time, usually a certain amount of seconds, to power up or spin back up before data can be accessed. Some disk drives may contain data that is accessed infrequently, and this data may reside in a small subsection of the disk drive. However, typical application access protocol dictates that the disk drive must be accessible within sub 1 second latencies, therefore the disk drive must continue to spin to prepare for the eventuality of an access request. Therefore, a current solution for rapid access to disk drives is to keep all disk drives spinning continuously, especially in an enterprise environment. A drawback of continuous spinning disk drives is that power consumption is continuous and wear and tear on the disk drives is also continual.

For example, in a massive array of idle disks (MAID) configuration with caching a plurality of passive storage device, for example passive disk drives are in standby mode until needed. A fraction of the passive drives act as overhead, i.e., remains powered up, and thus this limits the potential energy savings of passive drives in standby mode. For example, an array of ten disk drives may include an additional active cache drive, the cache drive remains spinning at all times. Thus, the MAID cache configuration cannot save more than 90% of the energy of a system that is constantly active with 10 data drives.

It would therefore be desirable to provide a method, and system employing the method, for allowing fast access to data on a data storage device, such as a computer disk drive, while saving energy in powering the device, e.g., the disk drive. It would further be desirable for a data storage device such as a disk drive to be shut down, without adversely affecting data retrieval times.

SUMMARY OF THE INVENTION

In an aspect of the invention, a method for virtual data storage migration includes: providing a plurality of active data storage devices each in a powered up state and communicating with at least one computer system; providing a plurality of data for storage on the active data storage devices, the data being managed by the computer system; selecting at least one archive data storage device from the plurality of active data storage devices; archiving specified data to the archive data storage device when the data meets a specified archive criteria; maintaining the archive data storage device in the powered up state for a predetermined period of time; determining when at least a portion of the archived specified data is accessed in the archive data storage device; migrating a preselected amount of the archived data to at least one of the active data storage devices after the at least a portion of the archived data is accessed; and powering down the archive data storage device after the preselected amount of archived data is migrated to the active data storage device.

In a related aspect, the method further includes: creating an archive data storage portion on the archive data storage device; and archiving data to the archive data storage portion when the data meets the specified criteria. The method may further include determining a criteria for labeling data as archive data. Also, the archive data criteria may include frequency of data access over a period of time. The criteria may include a duration of time from the creation of the data. Further, the criteria may include a time period wherein the data is inactive. The method may further include: initiating the archive data storage device to power up from a powered down state when a data request is initiated by a user for data on the archive data storage device. The method may further include: determining when the at least a portion of the archived specified data is accessed more than once in the archive data storage device; and migrating the preselected amount of the archived data to the at least one of the active data storage devices after the at least a portion of the archived data is accessed more than once. Also, the method may further include: determining when the at least a portion of the archived specified data is accessed more than once in a specified period of time in the archive data storage device; and migrating the preselected amount of the archived data to the at least one of the active data storage devices after the at least a portion of the archived data is accessed more than once in the specified period of time.

In another aspect of the invention, a system for migrating data includes, a plurality of active data storage devices each in a powered up state and communicating with at least one computer system. A plurality of data for storage on the active data storage devices, and the data is managed by the computer system. At least one archive data storage device is selected from the plurality of active data storage devices. Specified data is archived to the archive data storage device when the data meets a specified archive criteria. The archive data storage device is maintained in the powered up state for a predetermined period of time. A preselected amount of the archived data is migrated to at least one of the active data storage devices after the at least a portion of the archived data is accessed. The archive data storage device is powered down after the preselected amount of archived data is migrated to the active data storage device.

In another aspect of the invention, a computer program product for use with a computer includes the computer program product having a computer readable medium. The computer readable medium includes recorded thereon a computer program or program code for causing the computer to perform a method for virtual data storage migration. The computer communicating with a plurality of active data storage devices each in a powered up state and the computer managing a plurality of data stored on the active data storage devices. The method including the steps of: selecting at least one archive data storage device from the plurality of active data storage devices; archiving specified data to the archive data storage device when the data meets a specified archive criteria; maintaining the archive data storage device in the powered up state for a predetermined period of time; determining when at least a portion of the archived specified data is accessed in the archive data storage device; migrating a preselected amount of the archived data to at least one of the active data storage devices after the at least a portion of the archived data is accessed; and powering down the archive data storage device after the preselected amount of archived data is migrated to the active data storage device.

In a related aspect, the computer program product further includes: determining when the at least a portion of the archived specified data is accessed more than once in the archive data storage device; and migrating the preselected amount of the archived data to the at least one of the active data storage devices after the at least a portion of the archived data is accessed more than once. In another related aspect, the computer program product further includes: determining when the at least a portion of the archived specified data is accessed more than once in a specified period of time in the archive data storage device; and migrating the preselected amount of the archived data to the at least one of the active data storage devices after the at least a portion of the archived data is accessed more than once in the specified period of time.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
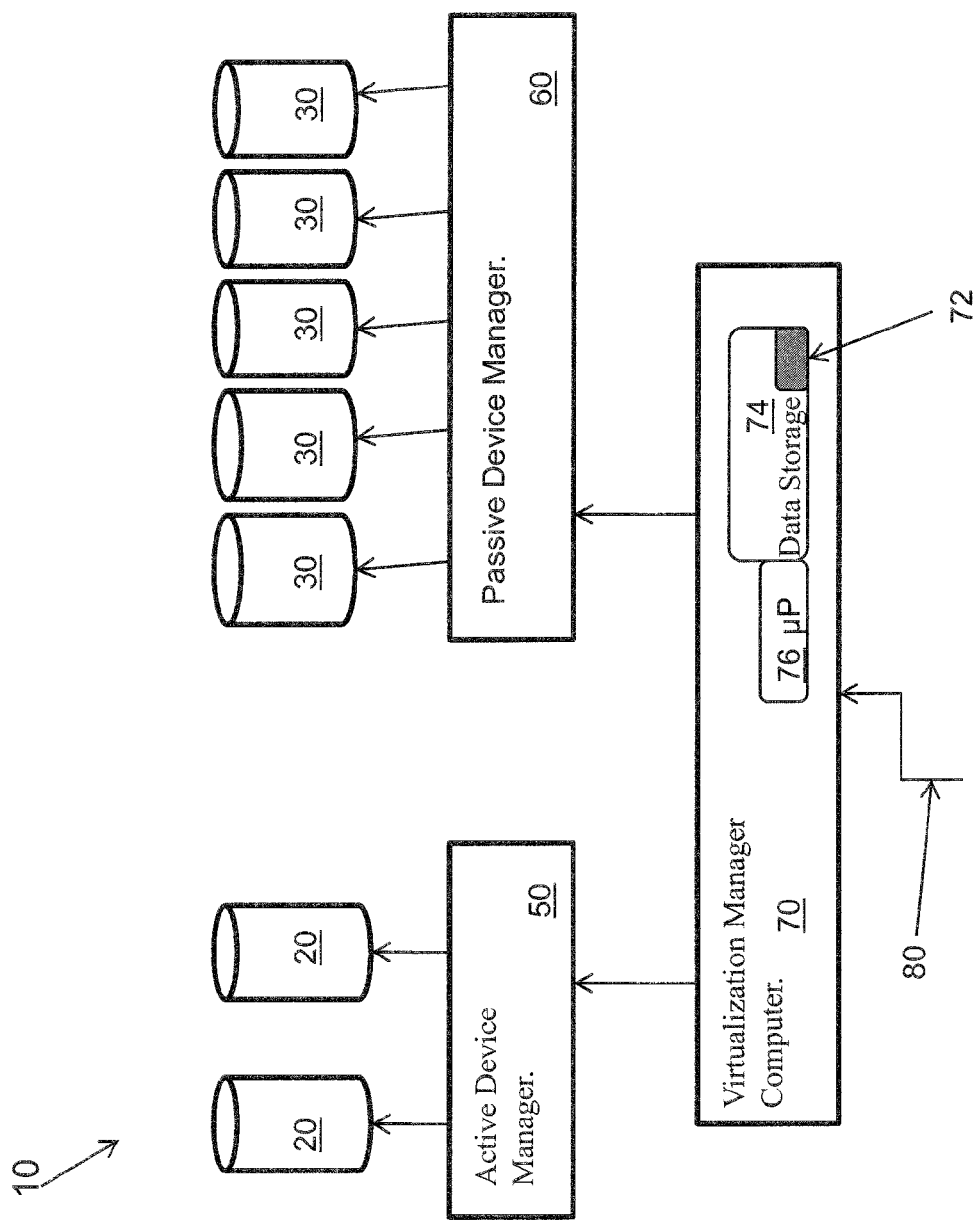
FIG. 1 is a block diagram of a system according to an embodiment of the invention depicting data storage devices and computers including a virtualization manager computer.

Referring to FIG. 1, an illustrative migration system 10 according to an embodiment of the invention includes active data storage devices embodied as active disk drives 20 that remain constantly on (powered up) or spinning, and passive data storage devices embodied as passive disk drives 30 which may be powered down or spun down following a specified period of inactivity. A virtualization manager computer 70 receives requests 80 from one or more users to store and/or retrieve data from the data storage drives 20, 30. The virtualization manager computer 70 communicates via a land line or wirelessly with the active devices 20 and passive devices 30. The virtualization manager includes a cache or active device or drive manager 50 and a passive device or drive manager 60 for managing their respective drives 20, 30. The cache manager 50 and passive drive manager 60 may be software programs included in the computer 70, or software programs on their own computers. The active drives 20 may provide temporary storage or cache for read and write traffic to the passive drives 30. The disk drives 20, 30 may be partitioned into 512 mega byte (MB) sectors. A cache directory maintains a least recently used (LRU) ordering and information about the location of the contained data. The cache data is examined for all read requests. Any matching request is sourced from the cache, even if the corresponding passive drive 30 is actually powered up.

The passive disk drives 30 are used as an archive data storage device for archiving specified data to the passive disk drives 30 or archive data storage devices. The specified data may include, for example, data meeting predetermined age requirements, e.g., having a time period measured from a time of creation of the data. A user may specify a policy that states a threshold criteria for labeling data as ready for archiving, for example, last accessed time, or frequency of access over a period of time. Thus, data statistics such as access information are maintained for determining when the threshold criteria is met.

For example, in write data requests, the write request first probes the cache, if there is a cache entry corresponding to the write address, the data is written to the cache 20. All entries are placed in a write-log, which is used to eventually store the writes to the passive drives 30. Write data that is the size of a full cache block (512 MB sectors) is written to the cache 20 even if an existing block has not been allocated. To maintain consistency, all read data requests examine the entries in the write log prior to accessing data from the cache 20 or the passive drives 30.

As data begins to be marked as requiring archiving or old, the virtualization manager 70 migrates the data onto selected passive disks 30 that may already contain a large proportion of old data. Thus, a random disk 30 may be chosen as the migration target, and recorded as the archive data target. Over time, the archive data target (or an array or disks) will eventually contain only old data, at which point the relevant command (e.g., small computer systems interface (SCSI)) to power down the disk is sent to power down the target passive disk 30. A user policy may dictate that old data is archived on powered down disks, especially when data has to be kept for long periods of time for compliance reasons. Further, one optimization of the method 100 may include regularly powering up (spin-up) of the powered down disks, and conducting a background data validity check. Any predictive failure analysis or large number of media errors are communicated to the user as an alert to perform preventative maintenance on this disk. In the event of media errors, the archive disk(s) 30 are not powered down until the errors are corrected, as another power off/on cycle could lead to data loss.

In one embodiment, a massive array of idle disks (MAID) configuration with caching includes the passive drives 30 remaining in standby until either a read data request misses in the cache, that is the data cannot be found in the cache of the active drives 20, or the write log for a specific drive grows too large. Once the passive drive 30 is powered up, the queue of read and write data requests is serviced. Following this, the passive drive 30 remains idle until a power down or spin down inactivity time limit is reached. Varying the inactivity time limit is one way to influence energy efficiency and performance.

Referring to FIG. 1, the system 10 provides virtual data storage migration. The active disk drives 20 are controlled by an active device manager 50 or a cache manager, and the passive disk drives 30 are controlled by a passive device manager 60. Both the active device manager 50 and the passive device manager 60 communicate with the computer system embodied as a virtualization manager computer 70. The virtualization manager computer 70 uses the active device manager 50 and the passive device manager 60 to manage the storage of data. It is understood that the computers 50, 60, and 70 are one embodiment of the invention and that other computer configurations may also be used, such as, separate computer systems for the active device manager 50 and the passive device manager 60. The virtualization manager computer 70 includes a computer program 72 saved on computer readable medium embodied as a data storage device 74 and the computer program is executed by a processor 76. The virtualization manager computer 70 selects an archive data storage device from the plurality of passive data storage devices 30. The manager 70 archives specified data to one or more of the archive data storage devices 30. The manager 70 may determine whether to archive data by determining whether data meets predetermined parameters, including determining types of data for archiving, or determining the age of data for archiving. The active data storage devices 20 are maintained in a power up state for a predetermined period of time. When at least a portion of selected data is not found in the active data storage devices 20, the computer virtualization activates one or more of the passive data storage devices 30 to retrieve the selected data. The passive data storage device 30 is maintained in a powered up state for a predetermined period of time, waiting for the selected data to be retrieved a second time. If the selected data is retrieved again, the manager 70 then migrates the selected data from the passive drives 30 to one or more of the active drives 20. Thereafter, the passive drive is powered down by the manager 70, thus saving energy in the powered down state, and providing the selected data for rapid availability on the active drives 20 while saving energy by powering down the passive drive 30. The passive device 30 may be powered down after a predetermined time period of inactivity. Further, the predetermined time period may be varied to accommodate energy consumption considerations.

Figure 2:
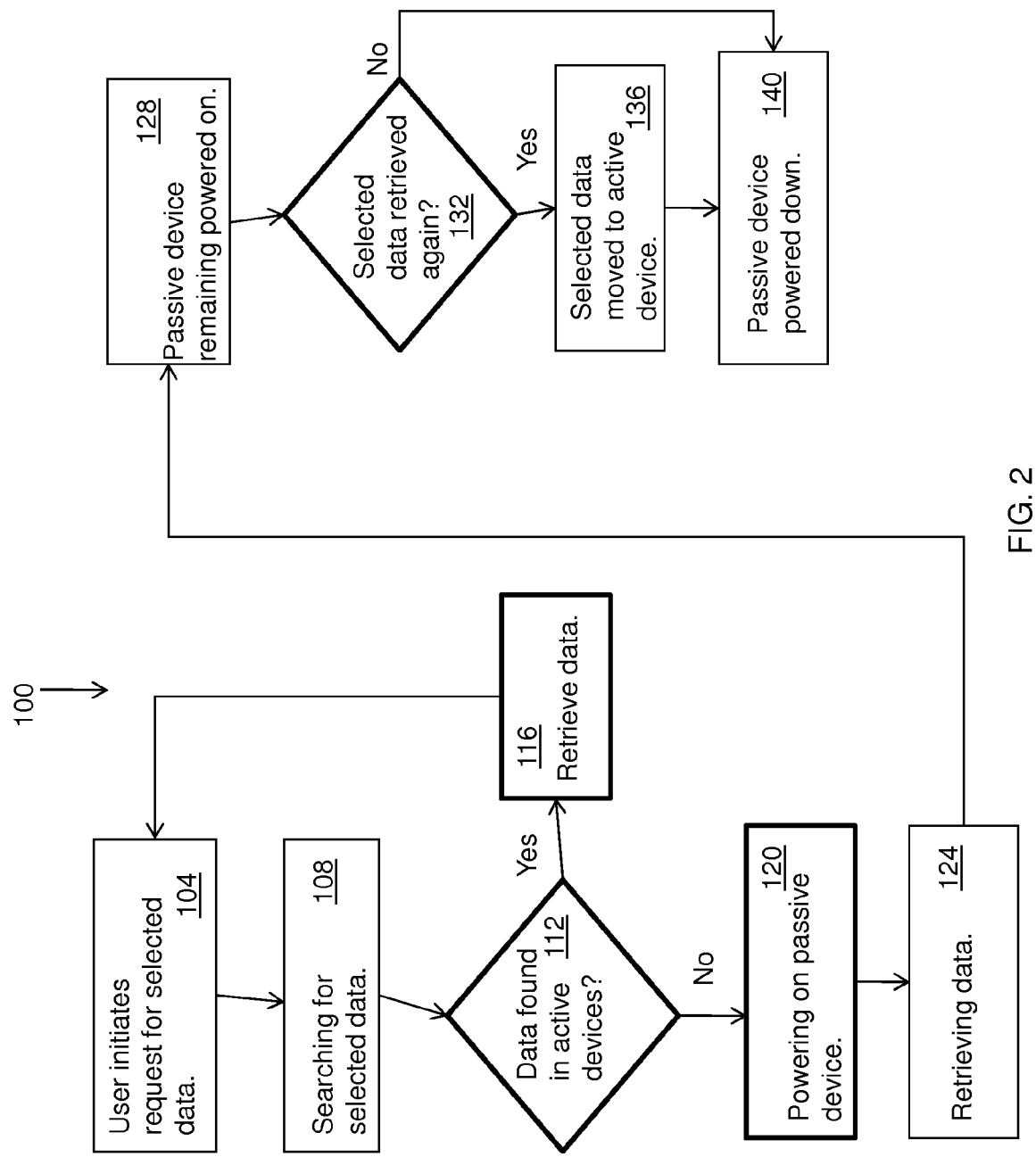
FIG. 2 is a flow chart of a method according to the present invention relating to the system shown in FIG. 1.

Referring to FIG. 2, in operation, a method 100 for virtual data storage migration uses the computer program 72 saved in the data storage device 74. The computer program 72 is executed by the processor 76 in the virtualization manager computer 70. The method 100 includes a user initiating a request 80 (FIG. 1) for selected data using the virtualization manager computer 70, in step 104. In step 108, data is selected for extraction, for example, a read operation. In step 112, if the data is found in the active devices, the method proceeds to step 116, retrieves the data from the active devices 20, and returns to step 104 to await another user initiated data retrieval. If the data is not found in the active data storage devices 20, the computer system searches for the selected data in one or more of the passive disk drives 30. One or more of the passive disk drives 30 may be in a powered down state or inactive mode (i.e., off, e.g., the disk drive not spinning), or a powered up state or active mode (i.e., on, e.g., a spinning disk drive).

When a passive disk drive 30 is in a powered down state, the passive disk drive is powered up to allow for data retrieval, as in step 120. The selected data can then be retrieved, as in step 124. The passive disk drive 30 is maintained in the powered up or powered on state for a predetermined period of time, in step 128, ready for further retrieval of the specified data. When the specified data is retrieved for a second time, the specified data is moved or migrated from the passive drive 30 to one or more active drives 20, in step 136, and the passive drive 30 is powered down, in step 140. If the selected data is not retrieved for a predetermined period of time, the passive device is powered down as in step 140. In an alternative, a portion of the specified data may be accessed for retrieval. In this scenario, the portion of the specified data is accessed and moved from the passive drive 30 to an active drive 20 as in the example above.

In an alternative embodiment, a MAID-no-cache design is employed which is similar to the embodiment above except no disks are used for caching data. In this example, all data requests are directed to the passive drives 30, and the passive drives 30 will remain active until an inactivity time limit is reached.

Thus, the present invention enables the virtualization manager 70 to migrate data based on access characteristics enabling fast access to data infrequently accessed, while enabling entire disks drives to be powered down. Fast access is provided to the infrequently accessed data by moving the data to active drives, while the powered down drives lower the power consumption of a data center environment. In a virtual storage environment, the host input output (I/O) device is abstracted from the physical I/O device by means of the virtualization manager 70 creating virtual disks or virtual storage. The virtualization manager 70 device migrates data without the need for downtime, or knowledge of the migration at the host I/O side. Virtual storage is created from pieces of physical disks and is presented in the virtualization manager 70 as a disk or storage volume.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for virtual data storage migration, comprising:
providing a plurality of active data storage devices each in a powered up state and communicating with at least one computer system;
providing a plurality of data for storage on the active data storage devices, the data being managed by the computer system;
selecting at least one archive data storage device from the plurality of active data storage devices;
archiving specified data to the archive data storage device when the data meets a specified archive criteria;
maintaining the archive data storage device in the powered up state for a predetermined period of time;
determining when at least a portion of the archived specified data is accessed in the archive data storage device;
migrating the accessed archived specified data to at least one of the active data storage devices after the archived specified data is accessed;
powering down the archive data storage device after the accessed archived specified data is migrated to the active data storage device;
determining when the archived specified data is accessed more than once in the archive data storage device; and
migrating the archived specified data to the at least one of the active data storage devices after the archived specified data is accessed more than once.

2. The method of claim 1, further comprising:
creating an archive data storage portion on the archive data storage device; and
archiving data to the archive data storage portion when the data meets the specified archive criteria.

3. The method of claim 1, further comprising:
determining a criteria for labeling data as archive data.

4. The method of claim 3, wherein the archive data criteria includes frequency of data access over a period of time.

5. The method of claim 3, wherein the criteria includes a duration of time from the creation of the data.

6. The method of claim 3, wherein the criteria includes a time period wherein the data is inactive.

7. The method of claim 1, further including:
initiating the archive data storage device to power up from a powered down state when a data request is initiated by a user for data on the archive data storage device.

8. A computer program product for use with a computer, the computer program product including a computer readable medium having recorded thereon a computer program or program code for causing the computer to perform a method for virtual data storage migration, the computer communicating with a plurality of active data storage devices each in a powered up state and the computer managing a plurality of data stored on the active data storage devices, the method comprising the steps of:
selecting at least one archive data storage device from the plurality of active data storage devices;
archiving specified data to the archive data storage device when the data meets a specified archive criteria;
maintaining the archive data storage device in the powered up state for a predetermined period of time;
determining when at least a portion of the archived specified data is accessed in the archive data storage device;
migrating the accessed archived specified data to at least one of the active data storage devices after the archived specified data is accessed;
powering down the archive data storage device after the accessed archived specified data is migrated to the active data storage device;
determining when the at least a portion of the archived specified data is accessed more than once in the archive data storage device; and
migrating the accessed archived specified data to the at least one of the active data storage devices after the archived specified data is accessed more than once.

9. A method for virtual data storage migration, comprising:
providing a plurality of active data storage devices each in a powered up state and communicating with at least one computer system;
providing a plurality of data for storage on the active data storage devices, the data being managed by the computer system;
selecting at least one archive data storage device from the plurality of active data storage devices;
archiving specified data to the archive data storage device when the data meets a specified archive criteria;
maintaining the archive data storage device in the powered up state for a predetermined period of time;
determining when at least a portion of the archived specified data is accessed in the archive data storage device;
migrating the accessed archived specified data to at least one of the active data storage devices after the archived specified data is accessed;
powering down the archive data storage device after the accessed archived specified data is migrated to the active data storage device;
determining when the at least a portion of the archived specified data is accessed more than once in a specified period of time in the archive data storage device; and
migrating the archived specified data to the at least one of the active data storage devices after the at least a portion of the archived specified data is accessed more than once in the specified period of time.

10. A computer program product for use with a computer, the computer program product including a computer readable medium having recorded thereon a computer program or program code for causing the computer to perform a method for virtual data storage migration, the computer communicating with a plurality of active data storage devices each in a powered up state and the computer managing a plurality of data stored on the active data storage devices, the method comprising the steps of:
selecting at least one archive data storage device from the plurality of active data storage devices;
archiving specified data to the archive data storage device when the data meets a specified archive criteria;
maintaining the archive data storage device in the powered up state for a predetermined period of time;
determining when at least a portion of the archived specified data is accessed in the archive data storage device;
migrating the accessed archived specified data to at least one of the active data storage devices after the archived specified data is accessed;
powering down the archive data storage device after the accessed archived specified data is migrated to the active data storage device;
determining when the archived specified data is accessed more than once in a specified period of time in the archive data storage device; and
migrating the accessed archived specified data to the at least one of the active data storage devices after the archived data is accessed more than once in the specified period of time.

* * * * *